May 14, 1935. P. T. SPRAGUE 2,001,588
PORTABLE TESTING INSTRUMENT
Filed March 7, 1932
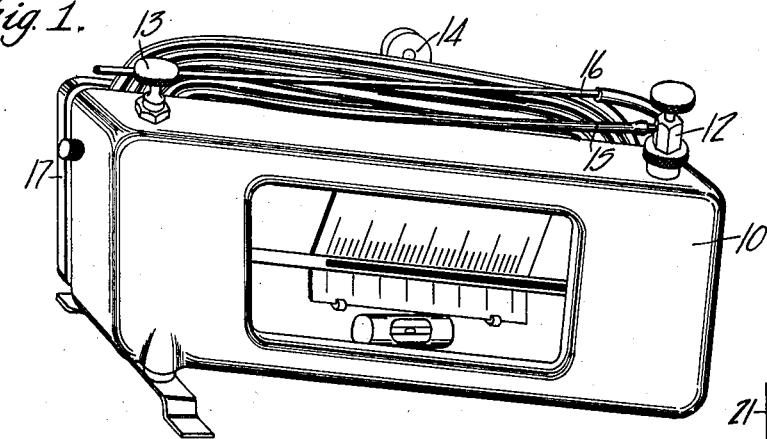
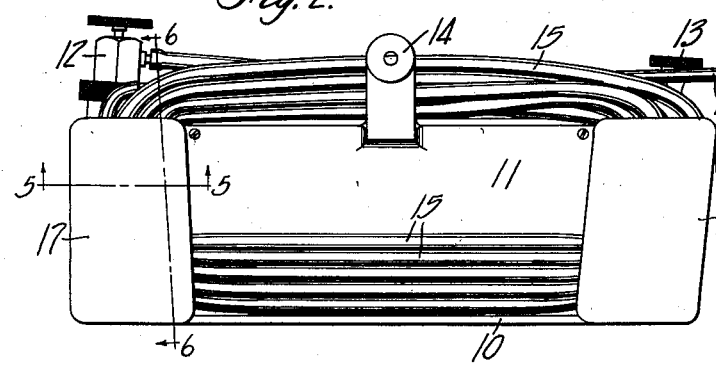
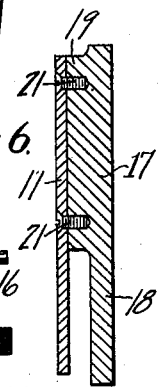
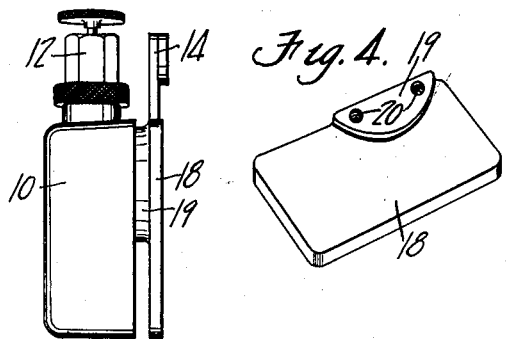
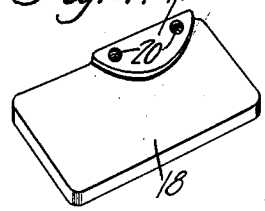
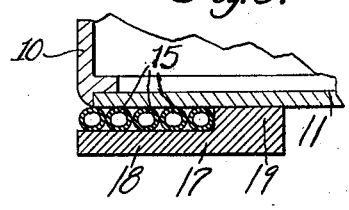
INVENTOR.
Philip J. Sprague.
BY
ATTORNEY.

Patented May 14, 1935

2,001,588

UNITED STATES PATENT OFFICE 2,001,588

PORTABLE TESTING INSTRUMENT

Philip T. Sprague, Long Beach, Ind.

Application March 7, 1932, Serial No. 597,286

5 Claims. (Cl. 242—96)

The invention relates to portable testing instruments, such as draft gages, of the type adapted to be carried in a case and having a flexible tube connected therewith for connection with a device to be tested.

Considerable difficulty has been experienced with the flexible tubes of testing instruments in the disposition of the instrument in a carrying case in a manner to accommodate the tube without breakage or kinking thereof. It is desirable that the carrying case be of the smallest size possible for convenience in carrying, and consequently the problem of positioning a long flexible tube in a small case without damaging the tube has been commonly met.

It is the object of my invention to provide means for positioning the long flexible tube of an instrument of this character within the outlines of the instrument and in a manner whereby the same will not be damaged in a carrying case of a size just large enough to receive the instrument.

A further object is to provide an instrument of this character with winding brackets about which the flexible tube of the instrument may be wound.

A further object is to provide an instrument of this character with brackets about which the flexible tube of the instrument may be wound, which brackets are constructed and positioned relative to the device to protect the tube against deforming and damaging stresses.

A further object is to provide an instrument of this character with winding brackets about which a flexible tube may be wound, said winding brackets being constructed to constrictively hold said tube whereby so much thereof as is not unwound is held in place and excessive tube lengths with attendant handling and possible entanglements are obviated.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a front perspective view of the instrument.

Figure 2 is a view of the instrument in rear elevation.

Figure 3 is an end view of the instrument.

Figure 4 is a perspective view of one of the winding brackets.

Figure 5 is an enlarged horizontal transverse sectional view taken on line 5—5 in Figure 2 and illustrating the bracket, the tube, and a portion of the instrument casing.

Figure 6 is an enlarged vertical transverse sectional view taken on line 6—6 of Figure 2 and illustrating the bracket and the back plate of the instrument casing by which the bracket is carried.

Referring to the drawing, which illustrates the preferred embodiment of the invention used in connection with a conventional portable draft gage, the draft gage comprises a casing 10 having a back plate 11, said casing having valves 12 and 13 projecting from the upper side thereof, and said back plate 11 carrying a vertical suspension bracket 14 projecting upwardly therefrom in off-set parallel relation to said back plate. A long flexible rubber tube 15 is connected with the valve 12, said tube generally being of a length of from 10 to 15 feet, and carries at its end a short metal tube 16. In use the gage is positioned or suspended at a convenient point, and the tube 15 extends therefrom to the chimney flue or other device to be tested.

At opposite ends of the gage and at the rear thereof are mounted winding brackets 17 each comprising a plate 18 and a boss or guide 19. The outer side edges and the top and bottom edges of the plates 18 register with the corresponding sides of the casing 10 of the instrument. Screw holes 20 are formed in the bosses 19 for the reception of screws 21 by which the brackets 17 are secured to the back plate 11, as illustrated in Figure 6. The bosses project flush with the inner side edges of the plates 18 and extend from adjacent the upper edge of the plate to a point substantially centrally between the upper and lower edges of the plate. The bosses are substantially semi-circular and are spaced from the outer side edges of the plates substantially equally to their spacing from the bottom edge of the plate. The plates 18 are positioned parallel to the back plate 11, and are spaced from said back plate a distance slightly less than the outer diameter of the flexible tube 15.

When the use of the instrument is completed and it is ready to be packed in its carrying case, not shown, the flexible tube is wound around the spaced brackets 17 and in engagement with the curved faces of the bosses 19. The tube is positioned between the plates 18 of the brackets and the back plate 11 of the gage, and the outer diameter of the tube being greater than the spacing of the plates 18 and back plate 11, the tube is slightly transversely deformed or pressed in by said plates, as illustrated in Figure 5, whereby it has a close frictional engagement with the plates which permits it to retain its wound position. The metal end tube 16 is of substantially the same length as the gage, and when the flexible tube is completely wound around said brackets said metal tube may lay along one side of the gage. When the flexible tube is wound around the brackets its side and bottom portions are positioned entirely within the outline of the instrument casing 10 and plates 18, and its upper portion projects above the instrument casing in front of bracket 14 but below the projection of the upper ends of valves 12 and 13. Consequently the tube when wound lies wholly within the over-all outline of the instrument and is protected by the instrument and brackets 17 against breakage, deformation or pinching when the instrument is placed in its carrying case.

It will be seen that the spacing of the bracket plates from the instrument casing to constrictively engage the tube when wound and positioned therebetween will hold the tube when only partially wound about the brackets. Thus when only a short length of the tube is required to be used in the use of the instrument, the remainder of the tube will be held in wound position by the brackets, whereby it is conveniently positioned without interfering with the use of the device and whereby excessive lengths of the tube with their attendant disadvantages of handling, entanglement and breakage are obviated.

The invention having been set forth, what is claimed as new and useful is:

1. The combination with an instrument having a long flexible tube connected therewith, of a pair of spaced brackets each comprising a plate and a boss having a curved edge and a thickness less than the outer diameter of said tube projecting from one face of said plate, said bosses being secured to said instrument in spaced relation and adjacent the opposite ends thereof, said tube being wound around the curved faces of said bosses and being constrictively positioned between said plates and the instrument.

2. The combination with an instrument having projections extending upwardly therefrom and a long flexible tube connected therewith, of a pair of winding brackets, said brackets each comprising a plate and a boss projecting from one face of said plate adjacent a corner thereof, means securing each of said bosses to said instrument in spaced relation to the side and bottom of the instrument, said tube being wound around said bosses and between said plates and the instrument whereby the sides and bottom of the instrument and plates protect the lower and side portions of the wound tube and the upper portion of the tube is disposed within the projected outline of said upper instrument projections.

3. The combination with an instrument having a long flexible tube connected therewith, of a pair of spaced brackets each comprising a plate and a guide having a curved face and of a width less than the outer diameter of said tube projecting from one side of said plate, said brackets being secured to said instrument in spaced relation and adjacent the opposite ends thereof with the guides engaging said instrument, said tube being wound around the curved faces of said guides and being slightly compressed between said plates and the instrument.

4. The combination with an instrument including means projecting upwardly therefrom and a long flexible tube connected therewith, of a pair of brackets carried by one side of said instrument adjacent opposite ends thereof and intermediate adjacent edges thereof, each bracket having a curved face and including a plate extending outwardly from said face and spaced from said instrument, said tube being wound around the curved faces of said bracket and positioned between said plates and instruments to be confined between said instrument and the plane of said plates and inwardly of the side and bottom edges of said instrument and beneath said projecting means, whereby said instrument, bracket and projecting means serve to protect said tube.

5. The combination with a testing instrument having a casing and a long flexible tube connected therewith, of a pair of spaced brackets carried by one side of said casing adjacent opposite ends thereof, each bracket having a curved face and including a plate extending outwardly from said face and spaced from said instrument, said tube being wound around said curved faces to be positioned between said plates and the side of said casing, said tube being protected by said plates and the instrument when wound around said brackets.

PHILIP T. SPRAGUE.